(No Model.)
J. W. BRADY.
Hermetic Sealing of Jars.
No. 232,170. Patented Sept. 14, 1880.
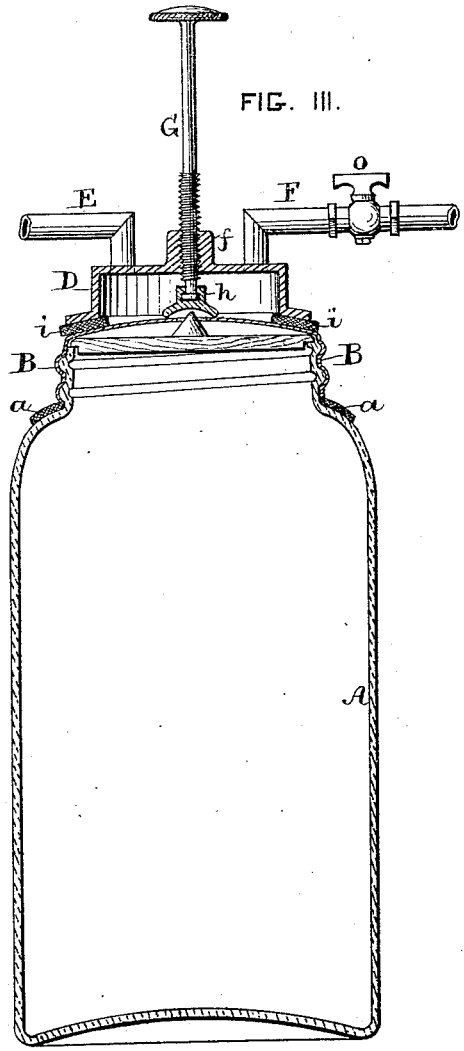
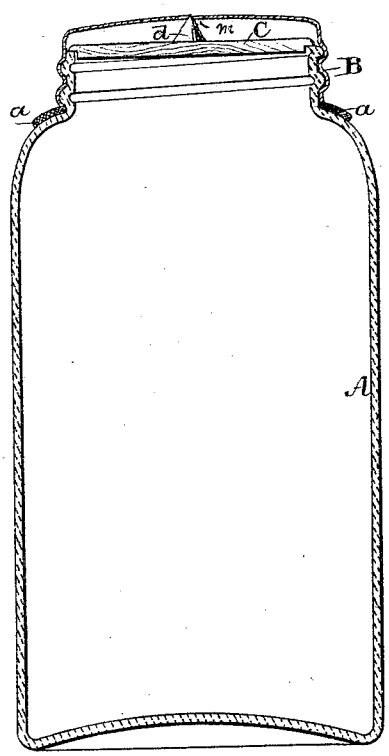
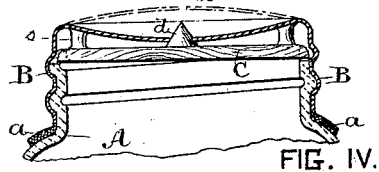
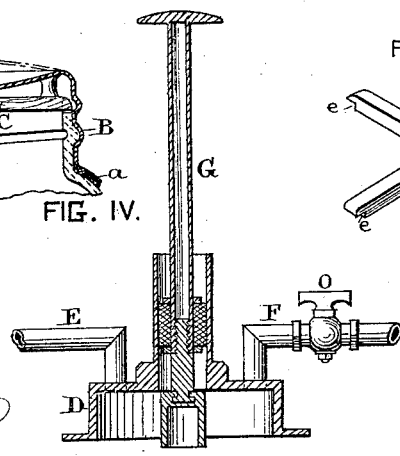
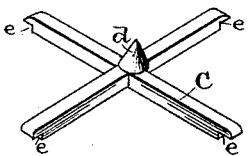
WITNESSES:
Alex. Scott
Wm H. Ginckel
INVENTOR:
J. W. Brady
N. PETERS, PHOTO-LITHOGRAPHER, WASHINGTON, D. C.

UNITED STATES PATENT OFFICE.

JAMES W. BRADY, OF CATONSVILLE, MARYLAND.

HERMETIC SEALING OF JARS.

SPECIFICATION forming part of Letters Patent No. 232,170, dated September 14, 1880.

Application filed August 7, 1880. (No model.)

*To all whom it may concern:*

Be it known that I, J. W. BRADY, a citizen of the United States, residing at Catonsville, in the county of Baltimore and State of Maryland, have invented certain new and useful Improvements in Hermetic Sealing of Jars, Cans, and other Vessels; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Figure I is a vertical central section of a vessel having a perforated flexible metallic cover, with the parts in position. Fig. II is a perspective view of the sealing-bar C and valve d. Fig. III is a vertical central section of a vessel having a flexible convex cover, with the sealing-bar and valve in position, and showing my device for exhausting the atmosphere and sealing the vessel, also in position. Fig. IV is a vertical central section of a modification of the sealing device shown in Fig. III. Fig. V is a modification of the sealing-bar shown in Fig. I, the cover of the vessel being depressed upon the valve and thereby sealed. Fig. VI is a perspective view and modification of the sealing-bar shown in Fig. II.

My invention relates to the hermetic sealing of jars, cans, and other vessels from the atmosphere after the same has been exhausted by any suitable means, thereby securing such vacuum as has been attained.

It consists in the improvements in jars, cans, or other vessels, hereinafter more fully set forth in the specification, and specifically pointed out in the claims.

A represents a fruit jar, can, or other vessel of any suitable form, and B the usual cover or screw-top, made commonly of tin or zinc. The cover screws down upon the top of the vessel in this instance, finding a seat on the rubber gasket *a*. The cover may be fixed to the vessel permanently, or may be removable and fastened by this device—viz., screw-threads, or any other, as any of these will answer my purpose.

C, in Figs. II and VI, represents a bar, which may be made in either form, straight or crossed, or even a disk, perforated or not, carrying on its upper surface a valve or plug, *d*. This valve is usually made of rubber, or it may be of rigid material covered with rubber.

The bar C is usually made separate from the cover B, and rests upon the rim of the vessel, the notches *e e* facilitating this; but notches may be made in rim of the vessel or seats on the inside to receive the bar, or otherwise. In some instances I attach the bar C to cover B rigidly, as shown in Fig. V at *s*, thereby being a part of the cover and independent of the vessel.

In the top and center of the cover B is a small orifice or hole, *m*, under which is placed the valve *d*, so as to register or enter the same when the rounded or convex portion of the cover is forced upon it, as shown in Fig. V.

Fig. I shows the position of the parts before being sealed, and the dotted lines in Fig. V show the same, while the full lines in Fig. V show the vessel sealed.

In sealing vessels by my device I can use any character of flexible material for the cover, and prefer to make it convex, as shown in Figs. I and II, so that by forcing the cover downward upon the valve it assumes a concave form, and adds, if possible, to the atmospheric resistance.

When the bar is used in connection with a tin can having a permanent cover, I provide seats near the top, on the inside of the can, for supporting it, or attach it to the cover, and make a hole in the cover directly over the valve *d*, and afterward solder on the cover in the usual way. The valve may project slightly into the orifice and serve to make correct registration of the parts; but this is not important.

I do not propose to limit myself to any particular construction of can, jar, or other vessel or cover, as my invention lies more particularly in other parts.

The means I employ for exhausting the atmosphere and compressing the cover upon the valve is as follows: D represents a metal dome, bell, or receiver, which is placed upon the top of the vessel to be sealed, and between the two is a suitable rubber gasket, *i*. From the upper part of this receiver project two pipes, E F, which communicate with its interior. The pipe E connects with any air-pump by means of a rubber hose. The pipe F communicates with the external atmosphere, and has a valve, o. In the central part of this receiver is a perforated internally screw-threaded hub, f, through which projects a screw-threaded rod, G, having at its upper end a milled head, by which it may be turned. To the lower end of the rod G is swiveled a head, h, that is raised or depressed by the rod when desired.

In Fig. IV is shown a modification, which differs from that shown in Fig. III in that, instead of a screw-threaded plunger, a packing is provided that may be expanded laterally by forcing the two parts of the plunger-rod together, as they are made screw-threaded and flanged to permit this, the rod G in this case not requiring a screw-thread in raising or lowering it.

I do not intend in this application to make a claim for my device in exhausting the atmosphere, as it will form the subject for another application.

It is not essential, in the operation of my jar, can, or other vessel, that this particular device be used, for there are many ways and means already known for exhausting the atmosphere from vessels for hermetic sealing. I only propose to show a simple means for carrying out my invention, which is applicable to general and varied uses in this connection.

To carry my invention into effect I place the bar carrying the valve upon the rim of the vessel in notches therein, or on seats made on the inside thereof for that purpose when it is made separate from the cover, and screw down or otherwise fasten the metallic top down upon the gasket, making a tight joint at this point. The hole m will then be directly over the valve d. Upon the cover the receiver D is then placed, and by means of the air-pump the atmosphere is exhausted from the vessel through the pipe E, and then the cover, by means of the rod G, is forced down upon the valve d, the head h being of such form as will nicely fit around the orifice m, but permit d to slightly protrude, as shown in Fig. V. The valve o is then turned, which permits the atmosphere to press upon the cover and allow the receiver to be removed.

What I claim, and desire to secure by Letters Patent, is—

1. The combination, in a jar or can, of a perforated yielding or flexible cover, a sealing-bar, C, carrying a valve, and suitable means for supporting the bar across the mouth of the jar or can, as and for the purpose set forth.

2. The combination, in a jar or can, of a perforated yielding or flexible cover and a removable sealing-bar, C d, situated beneath the cover and crossing the neck of the jar, as set forth.

In testimony whereof I affix my signature in presence of two witnesses.

JAMES W. BRADY.

Witnesses:
H. B. ZEVELY,
A. N. ZEVELY.